Feb. 28, 1961 W. DRAHEIM 2,973,156

TAPE RECORDER

Filed Nov. 29, 1957

INVENTOR.

WILLI DRAHEIM

BY Dicke and Craig

ATTORNEYS

United States Patent Office 2,973,156
Patented Feb. 28, 1961

2,973,156

TAPE RECORDER

Willi Draheim, Hannover-Bemerode, Germany, assignor to Rhein-Handel, Gesellschaft für Import, Export und Transit, Etablissement, Vaduz, Liechtenstein Filed Nov. 29, 1957, Ser. No. 699,623

Claims priority, application Germany Dec. 1, 1956

27 Claims. (Cl. 242—55.12)

The present invention relates to improvements in magnetic tape recorders.

Prior to this invention there have been numerous designs of magnetic tape recorders. One type of these known recorders in which the sound recording tape is driven, for example, by means of a roller which is rotated by a motor, requires special transmission and brake means to insure that the spools carrying the tape will rotate at the appropriate speeds so that the tape will travel at a uniform rate throughout its length, resulting in a sound record and a sound reproduction of a high fidelity. However, such a drive mechanism is so involved and requires so many high precision elements that the cost of such a tape recorder is very considerable.

In other more inexpensive types of tape transport devices for magnetic tape recorders, the spools carrying the tape are driven. This may be effected by much more simple means and with a smaller number of structural elements. However, if in a drive mechanism of this type the speed of revolution of the spools remains uniform, the rate of speed of the tape will vary slightly in accordance with the change in diameter of the wound spools and, therefore, the tape cannot travel past the sound head at an absolutely uniform rate of speed throughout its length. Such variation in the rate of speed of the tape as it runs from one spool to the other, in turn, results in a slight change in the modulation of the sound when reproduced. Although this may be undesirable for high-fidelity recordings, for example, of music, it is generally regarded as adequate for tape recorders which are to be used for taking and reproducing less modulated recordings, for example, dictations and the like.

It is the principal object of the present invention to provide a drive and brake mechanism for a magnetic tape recorder of the second above-mentioned type which requires a very small number of parts, is exceedingly simple to manufacture and to operate, and therefore reduces the cost of the tape recorder considerably.

As in most tape recorders of this type the two spool holders of the tape transport apparatus according to the invention which support the spools on which the tape is wound are arranged side by side. Depending upon whether the tape is to be moved across the sound head for the purpose of recording or reproducing the sound or whether the tape is merely to be rewound, the drive must be selectively and alternately transmitted either to one or to the other of the two spool holders to wind the tape thereon while unwinding and transporting it from the undriven spool holder.

According to the present invention the driving motor of the apparatus has a rotor shaft which only needs to be rotatable in one direction and which projects axially from both ends of the motor housing. The motor is mounted between the two spool holders so as to be pivotable from an intermediate stop position in either direction to a certain angular operating position. In the intermediate position, both ends of the motor shaft will be in operative engagement with both spool holders and, since in this position the motor will also be disconnected from the current, it will then exert a strong brake effect upon the spool holders and quickly stop the travel of the tape. In the angular position, the motor will be switched on and one end of the motor shaft will be in operative engagement with one of the spool holders so as to rotate the same, while the other end will be disengaged from the other spool holder so that the tape thereon can unwind.

The entire operation of pivoting the motor from one operative position to another and of switching it on or off may be carried out by a single hand-operated control lever. This is achieved by a spring member which has the double function of first closing the electric circuit of the motor so as to start its rotation and of then transmitting the pivoting movement of the control lever to the motor so that the latter will then drive one spool holder or the other. The motor will therefore run only when it is pivoted toward one side or the other, while when the control lever is placed in its central or stop position and the motor is disposed horizontally, the rotation of the motor will be stopped and the two ends of the motor shaft will engage against both spool holders to stop them likewise.

According to a preferred embodiment of the invention, each of the two shaft ends of the motor carries a friction roller of a resilient material, the peripheral surface of which is adapted to be pressed against an edge of the respective spool holder by a single spring acting upon the motor suspension. This same spring also serves the function of retaining the entire motor suspension in the respective adjusted position by resiliently pressing the control handle into one or another of three grooves in a stationary element which determine the three operative positions of the motor and motor switch. The two friction rollers on the ends of the motor shaft are made of different diameters so as to impart different speeds to the tape when traveling in one direction for the purpose of recording or reproducing sound or when traveling in the opposite direction for rewinding the tape from one spool to the other.

Further objects, features, and advantages of the present invention will become apparent from the following detailed description thereof, particularly when read with reference to the accompanying drawings, in which—

Fig. 2 is a similar view but with the driving motor in a tilted position in which one friction wheel of the motor is in driving engagement with one spool holder, while the other friction wheel is disengaged from the other spool holder; while

Figure 1:
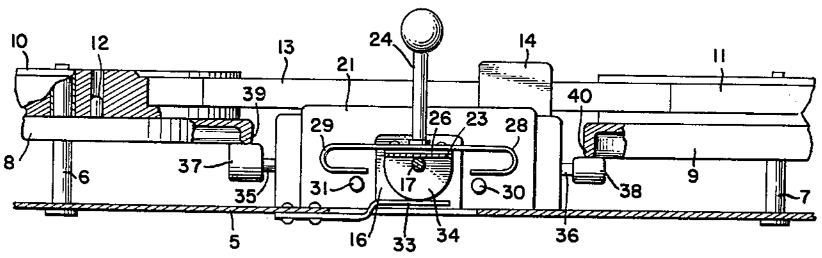
Fig. 1 is a side view of one preferred embodiment of a part of the magnetic tape recorder according to the invention illustrating the driving motor in its central position in which both friction wheels of the motor are in engagement with both spool holders.

Referring to the drawings, the new tape transport driving mechanism consists of a pair of shafts 6 and 7 which are mounted on a base plate 5 and on which round tables 8 and 9 are rotatably mounted which serve as holders for supporting the magnetic tape spools 10 and 11. Carrier pins 12 which are mounted in eccentric positions on tables 8 and 9 are provided to transmit the rotation of the tables to spools 10 and 11. The tape 13 is adapted to unwind freely from one spool while it is wound upon the other spool, and during such passage it is conducted past the magnetic sound head 14.

Base plate 5 has two portions thereon which are bent upwardly to form bracket members 15 and 16 which provide the bearings for mounting the means for suspending and pivotably mounting the electric motor 22. These suspension means essentially comprise a shaft 17 which extends in a direction transverse to the axis of motor 22 and is rigidly connected to the motor. The free end portion 18 of shaft 17 remote from motor 22 is rotatably and pivotably mounted and confined in a bearing aperture in bracket 15, while the other end portion 20 extends through a vertically elongated aperture 19 in bracket 16 whereby this end of shaft 17 may be raised and lowered with respect to base plate 5 by a vertically swinging pivoting movement of the shaft about its pivot bearing within bracket 15.

The end 20 of shaft 17 has rigidly secured thereto a supporting strap 21 which, in turn, carries motor 22. Shaft 17 also carries a U-shaped stirrup member 23 which is pivotable about the axis of shaft 17 and for this purpose has a control lever 24 secured thereto which passes through an aperture 25 in the upper arm of bracket member 15. One elongated wall of aperture 25 has three detent recesses 41, 42, and 43 therein which determine the three operative positions of control lever 24 and are of different depths, the central recess 42 being slightly deeper than the two lateral recesses 41 and 43. An elongated leaf spring 27 is secured to stirrup member 23 but is separated therefrom by an insulating strip 26. The free ends 28 and 29 of spring 27 are adapted to engage resiliently with a pair of pins 30 and 31 which are secured to the supporting strap 21 of the motor on either side of bracket member 16. Aside from transmitting the pivoting movement of stirrup member 23 which is carried out by the operation of control lever 24, these two pins 30 and 31 are also connected to the electric circuit (not shown) of the motor and, in cooperation with one end of spring 27 or the other, serve as electric contacts so that, when one of the contact pairs 28, 30 or the other 29, 31 is closed, the motor will run.

In order to secure a proper driving connection and braking action upon spool holders 8 and 9, a leaf spring 33 is secured to plate 5 and extends through a cutout 32 therein. The free end of leaf spring 33 bears continuously against the arcuate edge of stirrup member 23 and thus urges motor 22 upwardly regardless of the position to which it might be pivoted.

Figure 2:
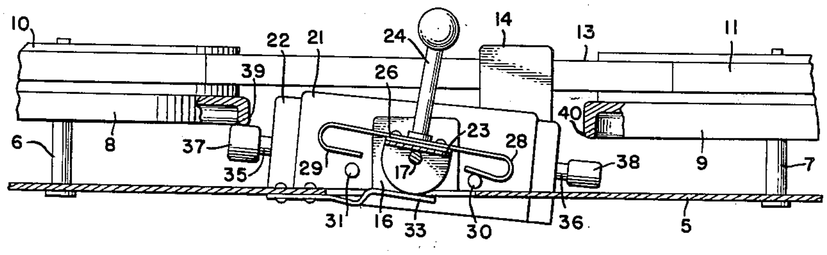

The configuration and position of the spring ends 28 and 29 relative the contacts 30 and 31 is such as to permit lost movement of the lever 24 relative to the motor before either set of contacts 28, 29 or 29, 31 is closed and also to permit further lost motion of lever 24 relative to the motor when the motor reaches an extreme tilted position, as shown, for example, in Figure 2.

Each of the two outwardly projecting ends 35 and 36 of the shaft of motor 22 carries a friction roller 37 or 38, respectively. Friction roller 37 is adapted to be placed into engagement with the rounded lower edge of depending flange 39 of spool holder 8, and friction roller 38 is adapted to be placed into engagement with the rounded lower edge of depending flange 40 of spool holder 9. Since spool 10 on spool holder 8 is intended for rewinding the tape from spool 11 and such rewinding operation should be carried out as quickly as possible, friction roller 37 is made of a considerably larger diameter than friction roller 38 which is adapted to drive spool 11 during the relatively slow recording and reproducing operations.

Figure 3:
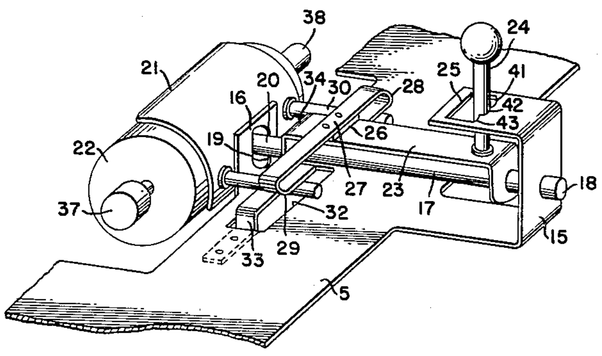
Fig. 3 is a perspective view of the motor and its suspension.

After thus describing the most essential structural features of the invention, the operation thereof is as follows:

At the beginning, control lever 24 should be in the central position where the tape transporting apparatus is in its neutral or stop position, as illustrated in Figs. 1 and 3, in which both friction rollers 37 and 38 are in resilient engagement with spool holders 8 and 9 and the free ends 28 and 29 of spring 27 are disengaged from pins 30 and 31. Since spring 27 and pins 30 and 31 also serve as a switch for connecting and interrupting the electric circuit of motor 22, the latter will not rotate when in this position after the current has been switched on.

Assuming that the tape 13 is largely wound upon spool 10 and leading past the sound head 14 to the other spool 11, if control lever 24 is then pivoted toward the left, the contact end 29 of spring 27 will engage contact pin 31 so that the motor will receive current and start to run. Since control lever 24 through the action of spring 33 upon stirrup 23 is always held in resilient engagement with the rear edge of aperture 25 and will thus tend to remain in one of recesses 41, 42, or 43, it must, when being pivoted toward one side or the other, ride over the toothlike projections separating these recesses. This, in turn, will pivot the forward end of stirrup 23 and of shaft 17 slightly downwardly and then again upwardly when lever 24 snaps into the adjacent recess. Such vertical pivotal movement of the forward end 20 of shaft 17 is made possible since bearing aperture 19 is vertically elongated. However, since recess 43 is not quite as deep as the central recess 42, the forward end 20 of shaft 17 will, when lever 24 engages in recess 42, remain in a position slightly lower than when it is in its central position. After control lever 24 in being pushed toward the left has passed beyond the apex between recesses 42 and 43 and after spring end 29 has made contact with pin 31 to start motor 22, it will snap into recess 43. During this last portion of the pivoting movement, spring end 29 presses so hard upon pin 31 as to overcome the resistance of spring 33 and thus allow motor 22 to be likewise pivoted. Friction wheel 38 will thereby be quickly pressed into engagement with spool holder 9, while the other friction wheel 37 will be disengaged from spool holder 8. Spool 11 will therefore be driven and the tape be wound thereon and at the same time be unwound from spool 10 which then runs freely. A recording may then be taken on tape 13 or be reproduced therefrom.

If the recording or reproduction is to be interrupted or discontinued, control lever 24 will be pivoted back toward its central position into aperture 42. The reverse of what has just been described will then take place, as follows: At first, motor 22 will be pivoted so that friction roller 38 disengages from spool holder 9, and then, when control lever 24 snaps into recess 42, spring end 29 will disengage from pin 31 so as to cut off the motor current and stop the motor. At the same time, through the action of spring 33, both friction wheels will be pressed against spool holders 8 and 9 and thus exert a strong braking action thereon to stop any further movement of the tape.

If the tape is to be rewound from spool 11 upon spool 10, for example, for a subsequent reproduction of a previous recording, control lever 24 will be pivoted toward the right from its control positions, as illustrated in Fig. 2, whereby contacts 28 and 30 will first be connected to start motor 22, and motor 22 will then also be pivoted so that the larger friction roller 37 will be pressed resiliently against spool holder 8 to rotate spool 10 and rewind the tape thereon at a relatively high speed. When the entire tape or at least the part on which the respective recording which is to be reproduced has been taken has been rewound on spool 10, control lever 24 is again returned to its central position to stop the operation.

In any of the above-mentioned operations, control lever 24 may also be employed to carry out the required switching operations for operating the electronic system of the magnetic sound recorder.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A magnetic sound recorder comprising a sound head, a pair of spool holders each adapted to receive a spool for winding a magnetic tape upon one spool while unwinding it from the other spool and for conducting said tape past said sound head, means for alternately driving one of said spool holders or the other comprising a motor having a shaft projecting at both ends from its housing, and means including an actuating member for pivoting said motor about an axis transverse to the axis of said motor to different selectable positions including two operating positions for engaging one end of said motor shaft with one of said spool holders and for disengaging the other end of said motor shaft from the other spool holder, said last-mentioned means including pivotal support means for said motor so constructed and arranged as to maintain in each of said selectable positions at least one end of said motor shaft in engagement with a respective spool holder and also including means to provide lost-motion movement of said member relative to said motor.

2. A magnetic sound recorder as defined in claim 1, wherein said actuating member is a single control lever for pivoting said motor to its different operating positions.

3. A magnetic sound recorder as defined in claim 1, further comprising a friction roller on each of said shaft ends providing friction surfaces for transmitting the rotation of said shaft to the respective spool holder.

4. A magnetic sound recorder as defined in claim 3, in which said friction rollers have different diameters for driving said spool holders at different rates of speed for recording and reproducing sound and for rewinding said tape, respectively.

5. A magnetic sound recorder as defined in claim 1, further comprising resilient means for retaining said motor in its different operating positions.

6. A magnetic sound recorder comprising a sound head, a pair of spool holders each adapted to receive a spool for winding a magnetic tape upon one spool while unwinding it from the other spool and for conducting said tape past said sound head, means for alternately driving one of said spool holders or the other comprising a motor having a shaft projecting at both ends from its housing, and means for pivoting said motor from a stop position about an axis transverse to the axis of said motor for engaging one end of said motor shaft with one of said spool holders and for disengaging the other end of said motor shaft from the other spool holder, said motor pivoting means including a single actuating control lever and means providing lost-motion movement of said lever relative to said motor, said motor pivoting means also including resilient means interposed in part between said control lever and said motor for transmitting the pivoting movement of said control lever resiliently to said motor, said resilient means tending to return said motor and said control lever back toward their stop positions.

7. A magnetic sound recorder comprising a sound head, a pair of spool holders each adapted to receive a spool for winding a magnetic tape upon one spool while unwinding it from the other spool and for conducting said tape past said sound head, means for alternately driving one of said spool holders or the other comprising a motor having a shaft projecting at both ends from its housing, means for pivoting said motor about an axis transverse to the axis of said motor for engaging one end of said motor shaft with one of said spool holders and for disengaging the other end of said motor shaft from the other spool holder, said motor pivoting means including a single actuating control lever and means providing lost-motion movement of said lever relative to said motor, and an electric switch operatively connected to said control lever whereby, when said motor is pivoted from its central position in one direction or the other so as to place said shaft in engagement with one spool holder or the other, said switch will also be operated to close the electric motor circuit so that said motor will rotate.

8. A magnetic sound recorder as defined in claim 7, in which, when said control lever is in its central position, said switch will be disconnected and both shaft ends of said motor will be in engagement with said spool holders and act thereon as a brake to stop the movement of said tape.

9. A magnetic sound recorder comprising a sound head, a pair of spool holders each adapted to receive a spool for winding a magnetic tape upon one spool while unwinding it from the other spool and for conducting said tape past said sound head, means for alternately driving one of said spool holders or the other comprising a motor having a shaft projecting at both ends from its housing, and means for pivoting said motor about an axis transverse to the axis of said motor for engaging one end of said motor shaft with one of said spool holders and for disengaging the other end of said motor shaft from the other spool holder, said motor pivoting means including a single actuating control lever and means providing lost-motion movement of said lever relative to said motor, said lost motion means comprising a spring member secured to said control lever and having two free ends extending in opposite directions, said spring ends being adapted to engage with said motor to transmit the pivoting motion of said control lever resiliently to said motor.

10. A magnetic sound recorder as defined in claim 9, further comprising a pair of contact members on said motor at opposite sides of said transverse pivoting axis of said motor whereby, when said control lever is pivoted in one direction, one of said spring ends first engages one of said contact members to close the electric motor circuit to start said motor, and when said control lever is further pivoted in the same direction, said spring end presses upon said contact member so as to pivot said motor.

11. A magnetic sound recorder as defined in claim 10, in which, when said control lever is in its central position, said spring ends are disengaged from said contact members to interrupt said motor circuit and stop said motor, while both shaft ends of said motor will be in engagement with said spool holders to act thereon as a brake to stop the movement of said tape.

12. A magnetic sound recorder comprising a sound head, a pair of spool holders each adapted to receive a spool for winding a magnetic tape upon one spool while unwinding it from the other spool and for conducting said tape past said sound head, means for alternately driving one of said spool holders or the other comprising a motor having a shaft projecting from both ends of the motor, and means for adjusting the position of said motor relative to said spool holders to at least three positions in one of which each of said shaft ends is coupled to a respective spool holder and in the other two positions, respectively, one or the other of said shaft ends is coupled to a respective spool holder and the remaining shaft end is disengaged from its respective spool holder.

13. A magnetic sound recorder comprising a sound head, a pair of spool holders each adapted to receive a spool for winding a magnetic tape upon one spool while unwinding it from the other spool and for conducting said tape past said sound head, means for alternatively driving one of said spool holders or the other comprising a motor having a shaft projecting at both ends from its housing, and means including an actuating member for pivoting said motor about an axis transverse to the axis of said motor for engaging one end of said motor shaft with one of said spool holders and for disengaging the other end of said motor shaft from the other spool holder, said actuating member being pivoted about an axis parallel to the pivotal axis of said motor and including means for providing lost-motion between said actuating member and said motor.

14. A magnetic sound recorder comprising a sound head, a pair of spool holders each adapted to receive a spool for winding a magnetic tape upon one spool while unwinding it from the other spool and for conducting said tape past said sound head, means for alternately driving one of said spool holders or the other comprising a motor having a shaft projecting at both ends from its housing, and means including an actuating member for pivoting said motor about an axis transverse to the axis of said motor for engaging one end of said motor shaft with one of said spool holders and for disengaging the other end of said motor shaft from the other spool holder, said actuating member being supported for only pivotal movement relative to said motor about one pivotal axis.

15. A magnetic sound recorder comprising a sound head, a pair of spool holders each adapted to receive a spool for winding a magnetic tape upon one spool while unwinding it from the other spool and for conducting said tape past said sound head, means for alternately driving one of said spool holders or the other comprising a motor having a shaft projecting at both ends from its housing, and means including an actuating member for pivoting said motor about an axis transverse to the axis of said motor for engaging one end of said motor shaft with one of said spool holders and for disengaging the other end of said motor shaft from the other spool holder, said last-mentioned means including means providing lost-motion movement of said member relative to said motor, said member having a neutral position in which said motor shaft engages both said spool holders and additional positions in which said motor shaft engages only one or the other of said spool holders, respectively.

16. Magnetic recorder apparatus according to claim 15, wherein the motor pivoting means includes spring means for holding the motor shaft engaged with the respective spool holders in each of said positions.

17. Magnetic recorder apparatus according to claim 15, wherein said motor pivoting means provides swinging movement of the motor about two axes each extending transversely of the motor axis to respectively move one or the other end of said shaft out of engagement with its respective spool holder.

18. A magnetic sound recorder comprising a sound head, a pair of spool holders each adapted to receive a spool for winding a magnetic tape upon one spool while unwinding it from the other spool and for conducting said tape past said sound head, means for alternately driving one of said spool holders or the other comprising a motor having a shaft projecting at both ends from its housing, means including an actuating member for pivoting said motor about an axis transverse to the axis of said motor for engaging one end of said motor shaft with one of said spool holders and for disengaging the other end of said motor shaft from the other spool holder, said motor pivoting means comprising means for providing lost motion between said actuating member and said motor including first spring means arranged to interconnect said actuating member and said motor to pivot the latter from a first position in response to movement of said actuating member, and second spring means acting upon said motor to bias it toward said first position.

19. A transport device for sound recorders for winding a magnetic tape or the like past a sound head, comprising a pair of rotatable spool holders each adapted to receive a spool for winding a magnetic tape upon one spool while unwinding it from the other spool, means for rotatably supporting said spool holders, means frictionally engageable with said spool holders for alternately driving one of said spool holders or the other comprising a motor having a rotor with axially projecting means extending from opposite ends of the motor, means for supporting said motor in a stop position wherein each of said projecting means frictionally engages a respective spool holder, said last-mentioned means including means for alternately pivoting said motor about the point of contact of one or the other of said projecting means with its respective spool holder to disengage the opposite projecting means from frictional engagement with its respective spool holder to provide different pivoted operating positions of the motor.

20. A transport device according to claim 19, wherein said motor supporting means includes a shaft rigidly connected to said motor and extending generally transversely to the axis of rotation of the motor rotor and means engaging said shaft for supporting said motor in its different operating positions with respect to said spool holders.

21. A transport device according to claim 20, wherein said motor supporting means includes bracket means for confining the movement of said motor supporting shaft, said bracket means including a bearing means supporting and confining a portion of said shaft remote from the motor for substantially only rotational movement about its axis and pivotal movement about a pivot point at said bearing means, said bracket means further including a structure between said shaft portion and said motor defining a vertically elongated aperture within which a second portion of said motor supporting shaft is located for generally vertical swinging movement about said pivot point at said bearing means.

22. A transport device according to claim 20 wherein said motor supporting means includes spring means for biasing said motor supporting shaft in a direction to engage each of said projecting means with their respective spool holders when the transport device is in the stop position.

23. A transport device according to claim 20, further including actuating means for selectively actuating one or the other of said projecting means out of engagement with its respective spool holder, said actuating means being supported for lost motion movement with respect to said motor supporting shaft and said motor.

24. A transport device according to claim 23, wherein said motor supporting means includes bracket means for confining the movement of said motor supporting shaft to rotation about its axis and swinging movement about a pivot point adjacent a portion of said shaft remote from the motor, said bracket means including detent means carried thereby and engageable with said actuating means for locating the latter in three positions corresponding to the stop position and the two different pivoted positions of said motor.

25. A transport device according to claim 23, including switch means for controlling the energization of said motor, said switch means being constructed and arranged for actuation by said actuating means only during said lost-motion movement of said actuating means relative to said motor.

26. A transport device according to claim 19, wherein said rotor has friction surfaces of different diameters engaging said spool holders.

27. A transport device according to claim 19, wherein each of said spool holders includes a depending flange engaged by a respective friction surface of said rotor.

References Cited in the file of this patent

UNITED STATES PATENTS

| | | |
|---|---|---|
| 773,985 | Ries | Nov. 1, 1904 |
| 1,144,673 | Wheeler | June 29, 1915 |
| 1,789,607 | Steuer | Jan. 20, 1931 |
| 2,468,453 | Mallentjer | Apr. 26, 1949 |
| 2,537,260 | Dale | Jan. 9, 1951 |
| 2,898,055 | Genning et al. | Aug. 4, 1959 |